United States Patent [19]

Seto

[11] Patent Number: 5,610,593
[45] Date of Patent: Mar. 11, 1997

[54] COMMUNICATION CONTROLLER AND COMMUNICATION CONTROL METHOD

[75] Inventor: Chiaki Seto, Kawasaki, Japan

[73] Assignee: Fujitsu Limited, Kawasaki, Japan

[21] Appl. No.: 594,107

[22] Filed: Jan. 30, 1996

Related U.S. Application Data

[63] Continuation of Ser. No. 235,651, Apr. 29, 1994, abandoned.

[30] Foreign Application Priority Data

Aug. 5, 1993 [JP] Japan .................................. 5-194793

[51] Int. Cl.$^6$ ................................................. G08B 21/00
[52] U.S. Cl. ........................... 340/653; 340/540; 340/654; 340/687; 340/693; 364/184; 364/185; 364/514 R
[58] Field of Search ................................... 340/653, 687, 340/540, 654, 693; 364/185, 184, 514 R

[56] References Cited

U.S. PATENT DOCUMENTS

| | | | |
|---|---|---|---|
| 4,419,658 | 12/1983 | Jarosz et al. | 340/693 |
| 4,641,133 | 2/1987 | Ono | 340/653 |
| 5,304,987 | 4/1994 | Brunson et al. | 340/654 |
| 5,347,265 | 9/1994 | Shimura | 340/653 |
| 5,406,260 | 4/1995 | Cummings et al. | 340/687 |

FOREIGN PATENT DOCUMENTS

| | | | |
|---|---|---|---|
| 0522483 | 1/1993 | European Pat. Off. | |
| 0017623 | 1/1984 | Japan | 340/687 |

OTHER PUBLICATIONS

Crayford, Ian, "10Base–T in the Office," *Wescon Conference Record*, vol. 35, Nov. 1991, North Hollywood, CA, pp. 232–237.

*Primary Examiner*—Glen Swann
*Attorney, Agent, or Firm*—Staas & Halsey

[57] ABSTRACT

A portable terminal unit is connected to a network, such as a LAN, to communicate with a host apparatus. The terminal unit has a decision unit for determining whether or not the terminal unit is connected to the transmission line and/or a decision unit for determining whether or not the terminal unit is connected to the external power source. the terminal unit also has a communication controller for starting to communicate with the host apparatus when the decision units determine that the terminal unit is connected to the transmission line and/or to the external power source. The terminal unit therefor does not perform useless communication control, such as when the terminal unit is not connected to a transmission line of the LAN or to an external power source.

20 Claims, 7 Drawing Sheets

COMMUNICATION CONTROLLER AND COMMUNICATION CONTROL METHOD

This application is a continuation, of application Ser. No. 08/235,651, filed Apr. 29, 1994, now abandoned.

BACKGROUND OF THE INVENTION

1. Field of the Invention

The present invention relates to communication control, such as protocol driver control, carried out by a terminal unit connected to a local area network, and, move particularly, to a protocol driver controller and a protocol driver control method employed by a portable terminal unit driven by a battery.

2. Description of the Related Art

A conventional terminal unit carries out protocol driver control, such as file transfer control, without regard to whether or not the terminal unit is connected to a transmission line of a local area network (LAN).

The terminal unit is designed to operate continuously once it is connected to the LAN transmission line and is provided with no measure to deal with disconnection from the transmission line during operation.

The terminal unit has a display panel to display communication conditions so that a user may know to some extent if an abnormality, such as breakage of a cable to connect the terminal unit to the LAN transmission line, occurs. In this case, the terminal unit continuously loads and executes a program to communicate with the LAN irrespective of the trouble in the transmission line because it has no means to test it.

Portable terminal units driven by a battery are widely used. To communicate with a host apparatus connected to the LAN, they are connected to transmission lines of the LAN. When no communication is required, they are disconnected from the transmission lines and are used indoors and outdoors to enter data.

These terminal units start to communicate with the host apparatus without regard to whether or not they are able to communicate. Accordingly, the terminal units will uselessly control protocol drivers, if no connection is established between them and the host apparatus through the LAN transmission lines.

The portable terminal units have a display panel of limited size to display a limited quantity of information compared with stationary type terminal units. Accordingly, the portable terminal units are mainly used simply to transmit entered data to the host apparatus. In this case, it is required to automatically transmit predetermined data from the portable terminal units to the host apparatus.

The conventional terminal units, however, are incapable of confirming whether or not they are connected to the LAN transmission lines when automatically transferring data to the host apparatus.

If the batteries in the portable terminal units become exhausted, communication with the host apparatus will be interrupted and data stored in the terminal units will be lost. It is necessary, therefore, to connect the portable terminal units to external power sources and to secure a power supply before communicating with the host apparatus through the LAN transmission line.

The conventional portable terminal units, however, have no means to determine whether or not they are connected to the external power sources and, therefore, risk communication failure due to a shortage of battery power.

SUMMARY OF THE INVENTION

An object of the present invention is to provide a terminal unit that tests whether or not it is connected to a LAN transmission line and an external power source before communicating with a host apparatus through the LAN transmission line and that starts to control a protocol driver only after confirming the connections.

In order to accomplish the above object, the present invention provides a terminal unit that communicates with a host apparatus through a network. The terminal unit has a decision unit for determining whether or not it is connected to the network through a transmission line and a communication controller for starting communication with the host apparatus when the decision unit determines that the terminal unit is connected to the network.

The decision unit determines that the terminal unit is connected to the network if it receives an acknowledge signal from an apparatus included in the network and provides a connection signal. In response to the connection signal, the communication controller starts to communicate with the host apparatus. The decision unit has an alarm unit for providing an alarm when the decision unit determines that the terminal unit is not connected to the network.

The present invention provides another terminal unit, that receives power from an external power source, to communicate with a host apparatus through a network. The terminal unit has a decision unit for determining whether or not it is connected to the external power source and a communication controller for starting communication with the host apparatus through the network when the decision unit determines that the terminal unit is connected to the external power source. The decision unit has an alarm unit for providing an alarm when the decision unit determines that the terminal unit is not connected to the external power source. The decision unit also has a power source controller for controlling power from the external power source.

BRIEF DESCRIPTION OF THE DRAWINGS

The present invention will be more clearly understood from the description as set forth below with reference to the accompanying drawings wherein.

DESCRIPTION OF THE PREFERRED EMBODIMENTS

Figure 1:
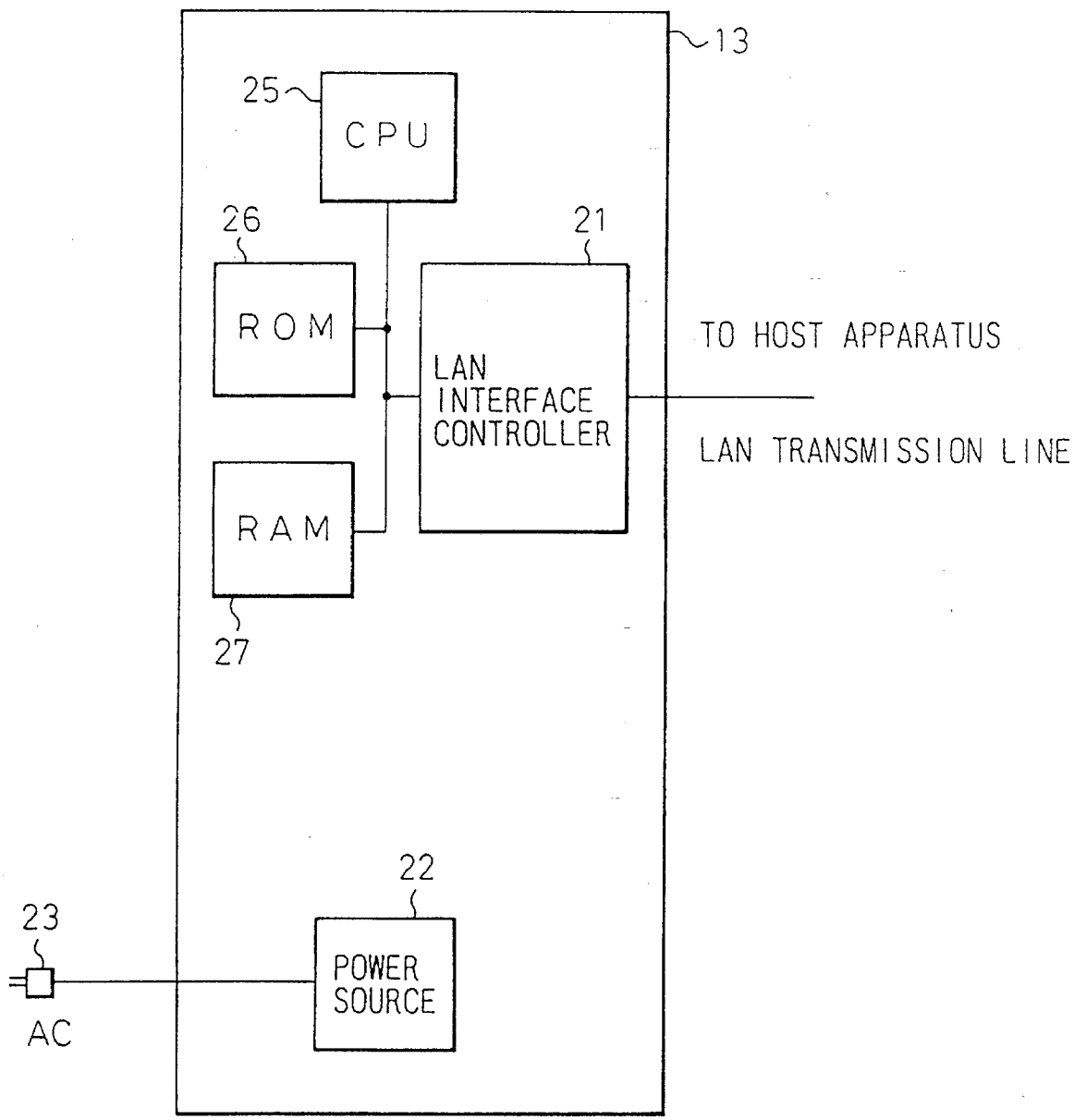
FIG. 1 is a block diagram showing a portable terminal unit according to a related art.

Before describing the preferred embodiments according to the present invention, a portable terminal unit according to the related art will be explained with reference to FIG. 1.

The portable terminal unit 13 has a LAN interface controller 21 connected to a transmission line of a LAN, to communicate with a host apparatus connected to the LAN. A CPU 25 controls the terminal unit 13 as a whole. A power source unit 22 is connected to an external AC power source 23. The terminal unit 13 includes a ROM 26 and a RAM 27.

The terminal unit 13 starts to communicate with the host apparatus without confirming whether or not the terminal unit 13 is connected to the transmission line. Namely, the terminal unit 13 will uselessly start a protocol driver even if it is not connected to the transmission line. In addition, the terminal unit 13 is incapable of confirming connection to the transmission line when automatically transferring data to the host apparatus through the LAN. If the terminal unit 13 is driven by battery and if the battery is exhausted, communication with the host apparatus will be interrupted and data stored in the terminal unit 13 will be lost because the-terminal unit 13 is provided with no means to test whether or not it is connected to the external power source 23.

Next, a communication control terminal unit according to an embodiment of the present invention will be explained.

Figure 2:
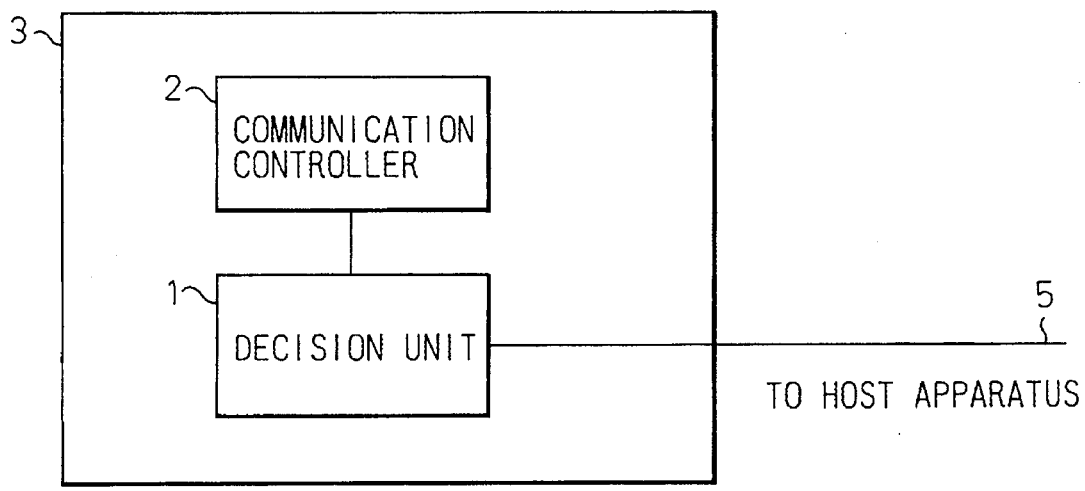
FIG. 2 is a block diagram showing a basic arrangement according to the present invention.
Figure 3:
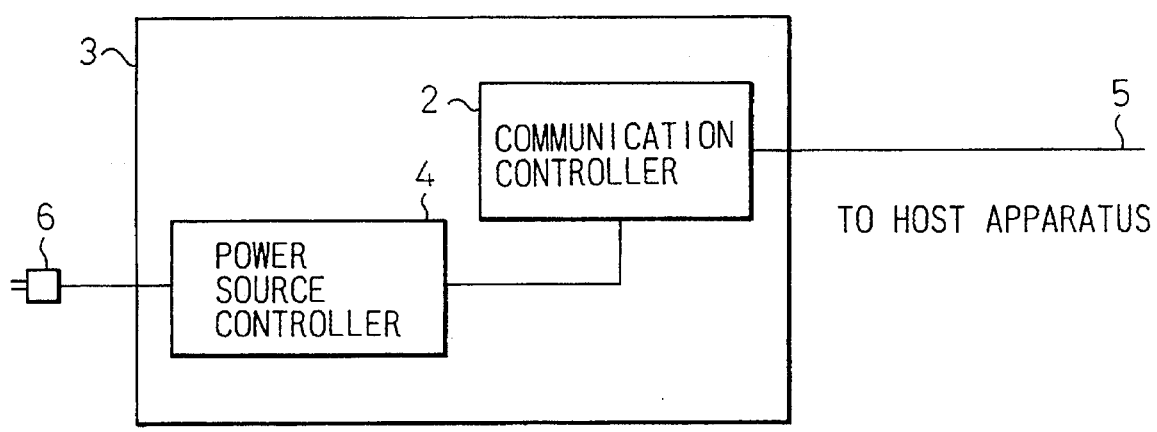
FIG. 3 is a block diagram showing another basic arrangement according to the present invention.

FIG. 2 is a block diagram showing a basic arrangement of a terminal unit 3 according to the present invention, and FIG. 3 is a block diagram showing another basic arrangement of the same.

The terminal unit 3 is connectable to, and is shown as actually connected to, a transmission line 5 of a network, such as a LAN, to communicate with a host apparatus connected to the network. The terminal unit 3 has a decision unit 1 for determining whether or not the terminal unit 3 is connected to the transmission line 5 (FIG. 2), and/or a decision unit 4 (a power source controller) for determining whether or not the terminal unit 3 is connected to an external power source 6(FIG. 3). When the decision units 1 and 4 determine that the respective connections we established, the terminal unit 3 starts to communicate with the host apparatus.

When receiving an acknowledge signal through the transmission line 5 from an apparatus contained in the network, the decision unit 1 determines that the terminal unit 3 is connected to the transmission line 5 and provides a connection signal. In response to the connection signal, a communication controller 2 starts to communicate with the host apparatus. If it is determined that the terminal unit 3 is not connected to the transmission line 5 and to the external power source 6, an alarm will be raised.

In this way, the decision units 1 and 4 determine whether or not the terminal unit 3 is connected to the transmission line 5 and external power source 6 and, according to the determinations, the terminal unit 3 starts to control a protocol driver with respect to the host apparatus. If the terminal unit 3 is not connected to the transmission line 5 the external power source 6, the terminal unit 3 does not uselessly control the protocol driver.

When the terminal unit 3 is connected to the LAN, the LAN sends a signal to the host apparatus to notify it that the terminal unit 3 is connected to the LAN. Thereafter, the terminal unit 3 receives an acknowledge signal. In response to the acknowledge signal, the terminal unit 3 starts to control the protocol driver.

When the terminal unit 3 is not connected to the transmission line 5 or the external power source 6, the terminal unit 3 may display a message or raise an alarm to notify an operator of the fact.

Figure 4:
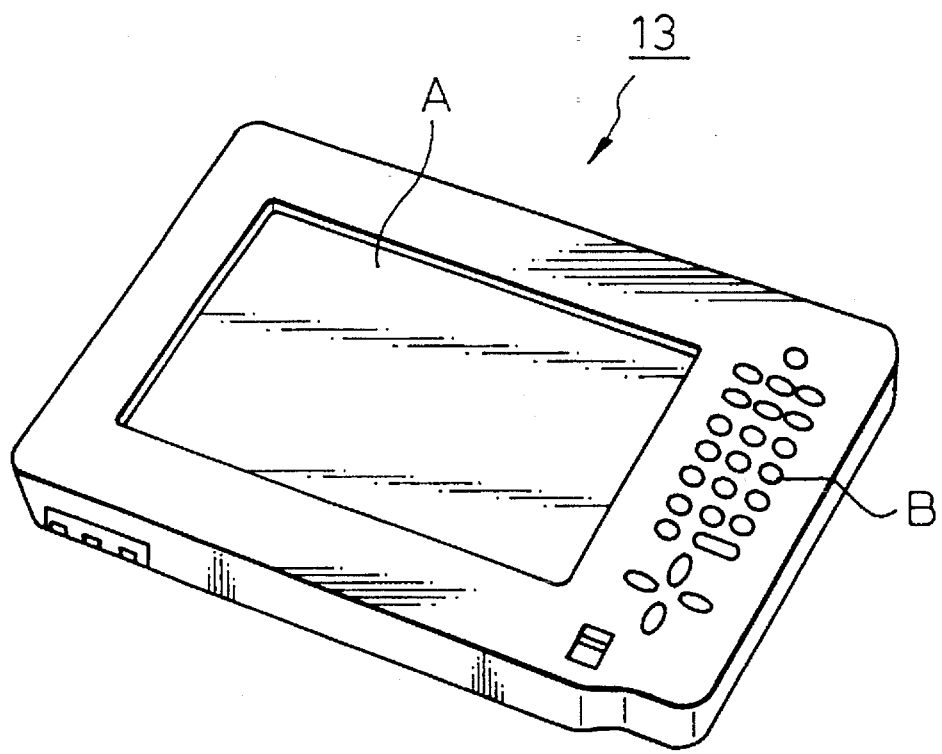
FIG. 4 is a perspective view showing a portable terminal unit according to an embodiment of the present invention.

FIG. 4 is a perspective view showing a portable terminal unit 13 according to an embodiment of the present invention.

The portable terminal unit 13 has a display panel A for displaying various messages. The display panel A is a touch panel that allows an operator to enter various data by touching the panel. The terminal unit 13 has a keyboard B for entering data. The terminal unit 13 has a connector (not shown) to be connected to a transmission line of a LAN and a connector (not shown) to be connected to an external power source. The terminal unit 13 incorporates a battery that drives the terminal unit 13 when collecting data.

Figure 5:
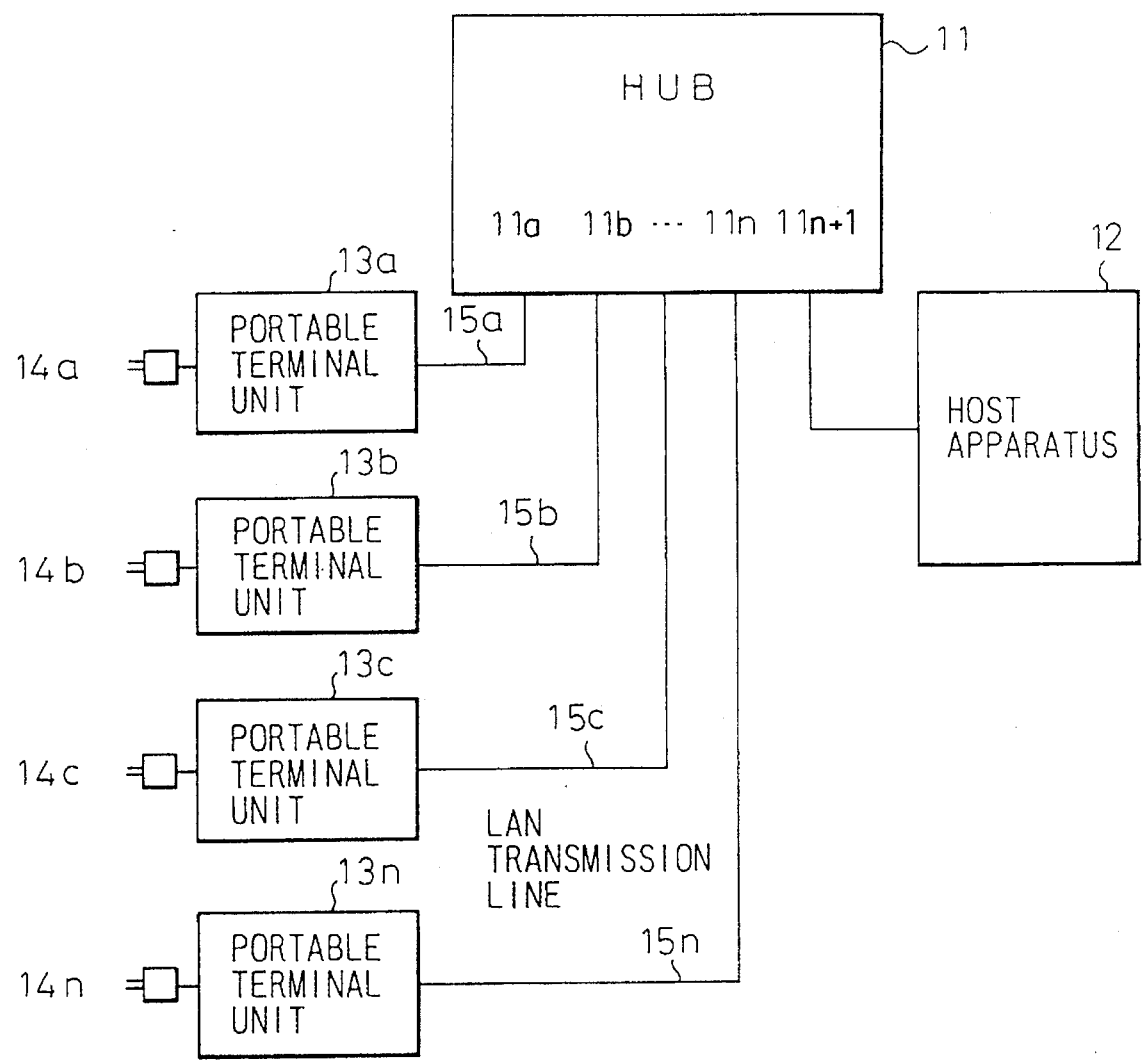
FIG. 5 is a block diagram showing a LAN system to which the portable terminal unit of FIG. 4 is connected.

FIG. 5 shows an example of a LAN system to which the portable terminal unit 13 of the present invention is connected. This example is ETHERNET 10BASE-T LAN system. This system is inexpensive because it employs twisted pair lines, such as indoor telephone cables, to send data with a base band signal at 10 Mb/s.

The system includes a hub 11 serving as a concentrator and having a multiple-port repeater function. A port 11 of the hub 11 is connected to a host apparatus 12. Other ports 11a to 11n of the hub 11 are connected to portable terminal units 13a to 13n, respectively, whenever the terminal units communicate with the host apparatus 12.

The host apparatus 12 is always ready to communicate with the terminal units 13a to 13n. When any one of the terminal units 13a to 13n is going to communicate with the higher (host) unit 12, the terminal unit 13i ("i" being any one of "a" to "n" ) is first connected to a corresponding external power source 14i. When the terminal unit 13i is then connected to a transmission line 15i of the LAN, it provides a link pulse to the hub 11 through the transmission line 15i.

The hub 11 detects the link pulse and confirms that the terminal unit 13i is been connected to part i (i.e., the corresponding one of the ports 11a to 11n). The hub 11 enables the port and sends a link pulse to the terminal unit 13i. ALAN interface controller (not shown) of the terminal unit 13i detects the link pulse through the enabled port and turns on a link integrity signal. Thereafter, the terminal unit 13i confirms that it is connected to the external power source 14i and activates a LAN protocol driver to communicate with the host apparatus 12 through the transmission line 15i.

Figure 6:
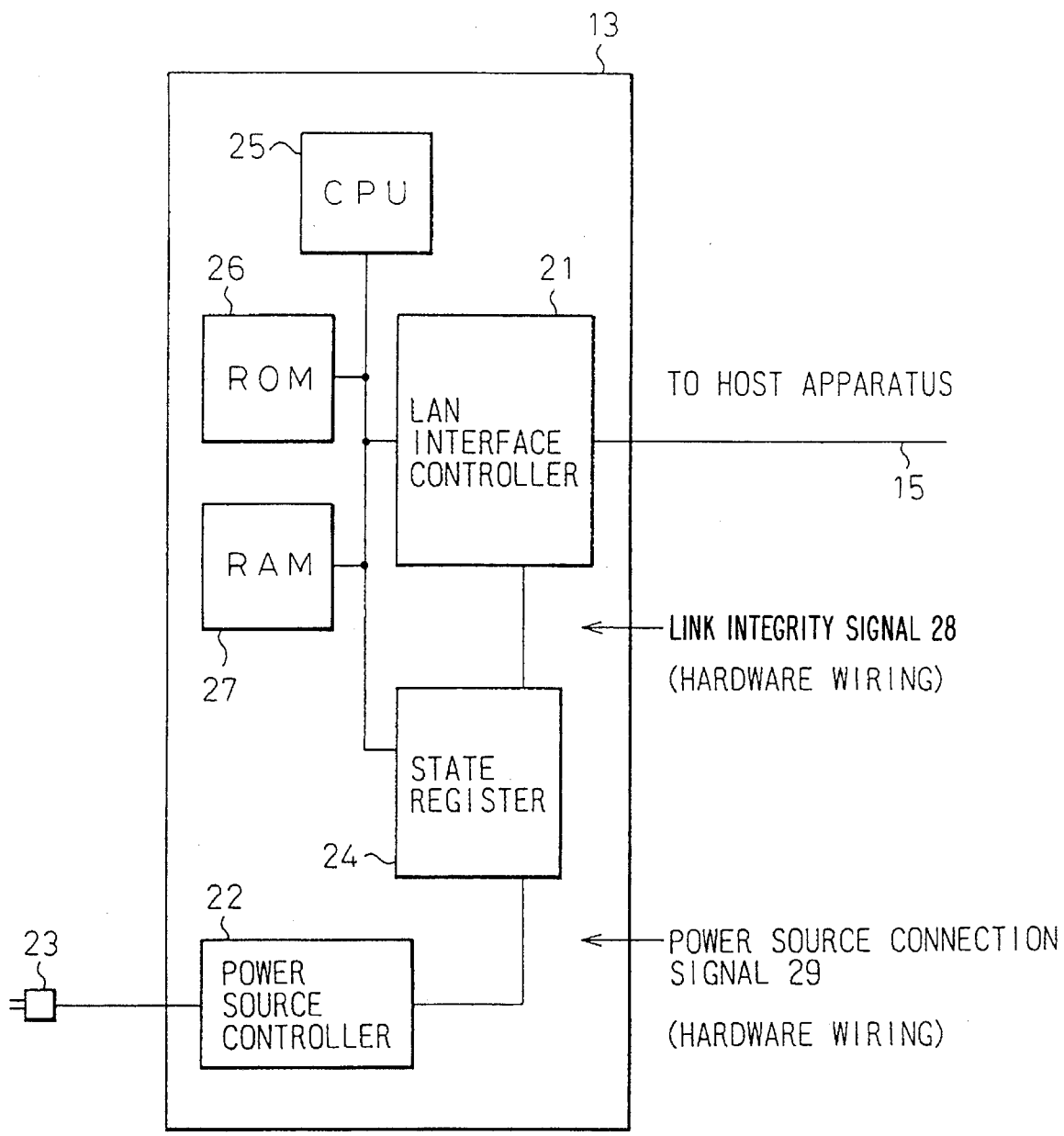
FIG. 6 is a block diagram showing the portable terminal unit of FIG. 4.

FIG. 6 is a circuit diagram showing a portable terminal unit 13 corresponding to any one of the portable terminal units 13a to 13n of FIG. 5.

ALAN interface controller 21 controls communication through a transmission line 15 and determines whether or not the terminal unit 13 is connected to the transmission line 15 according to a link pulse provided by the hub 11. The transmission line 15 corresponds to any one of the transmission lines 15a to 15n of FIG. 5. A power source controller 22 controls power from an external power source 23 and tests a power source voltage to determine whether or not the terminal unit 13 is connected to the external power source 23. The external power source 23 corresponds to any one of the external power sources 14a to 14n of FIG. 5.

A state register 24 is connected to the LAN interface controller 21 and power source controller 22. The state register 24 stores a connection state of the LAN interface controller 21 to the LAN transmission line 15 as well as a connection state of the power source controller 22 to the external power source 23. A CPU 25 controls the terminal unit 13 as a whole and a protocol driver. A ROM 26 stores control programs and a RAM 27 stores application programs and user data.

In response to a link pulse from the hub 11, the LAN interface controller 21 sends a link integrity signal 28 to the state register 24. When the terminal unit 13 is connected to the external power source 23, the power source controller 22 sends a power source connection signal 29 to the state register 24. Namely, the power source controller 22 monitors the voltage of the external power source 23, and when the voltage is above a predetermined value, provides the power source connection signal 29.

Figure 7:
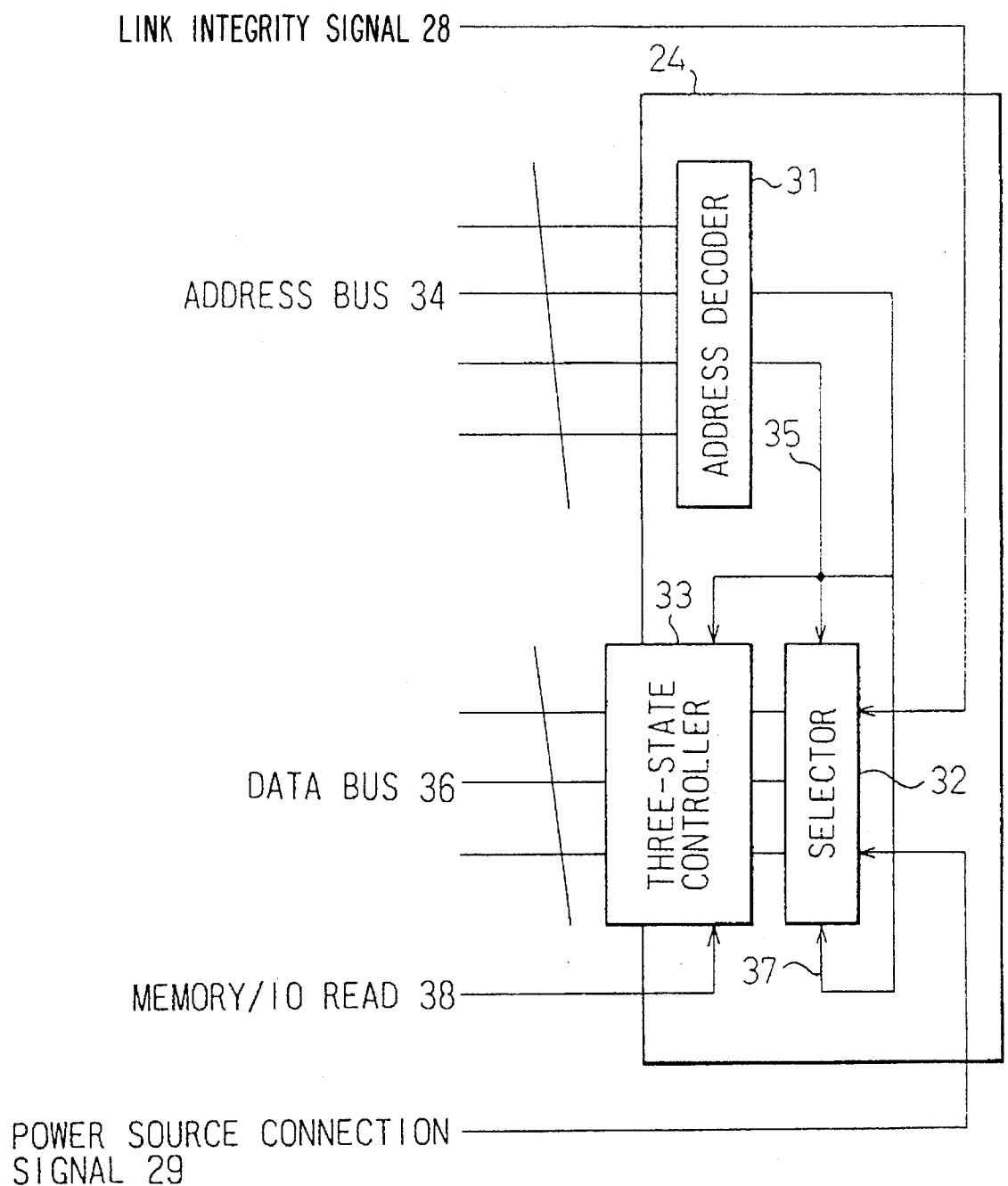
FIG. 7 is a block diagram showing a state register contained in the portable terminal unit of FIG. 6.

FIG. 7 shows the details of the state register 24.

The state register 24 has an address decoder 31 to provide a select signal 35 to a selector 32. The selector 32 receives the link integrity signal 28 and power source connection signal 29 and, according to the select signal provided by the address decoder 31, selects one of the signals 28 and 29. The state register 24 also has a three-state controller 33.

Operations of the state register 24 will be explained with reference to FIGS. 6 and 7.

The state register 24 maps the link integrity signal 28 and power source connection signal 29 into a memory space or into an I/O space, so that the state of the register 24 is readable through the memory or the I/O space.

For example, the link integrity signal 28 is mapped to the address 7F10 in the I/O space and the power source connection signal 29, to address 7F12 in the I/O space.

To confirm the ON/OFF state of the link integrity signal 28, the CPU 25 sends the contents of address 7F10 to an address bus 34.

The address decoder 31 recognizes that the address of the link integrity signal 28 has been specified and provides the selector 32 and three-state controller 33 with a link integrity select signal 35 to enable the data related to the link integrity signal. In response to an I/O read command, the link integrity signal data are provided to a data bus 36, and the CPU 25 reads the data in response to a rise or a fall of the I/O read command.

To confirm a connection state of the external power source 23, the CPU 25 sends the contents of address of 7F12 to the address bus 34.

The address decoder 31 recognizes that the address of the power source connection signal 29 has been specified and provides the selector 32 and three-state controller 33 with a power source connection select signal 37 to enable the data related to the power source connection signal.

In response to an I/O read command, the power source connection signal data are provided to the data bus 36, and the CPU 25 reads the data in response to a rise or a fall of the I/O read command.

In this way, the link integrity signal 28 and power source connection signal 29 stored in the state register 24 are read and, according to the read signals, the CPU 25 starts to communicate with the host apparatus 12.

Figure 8:
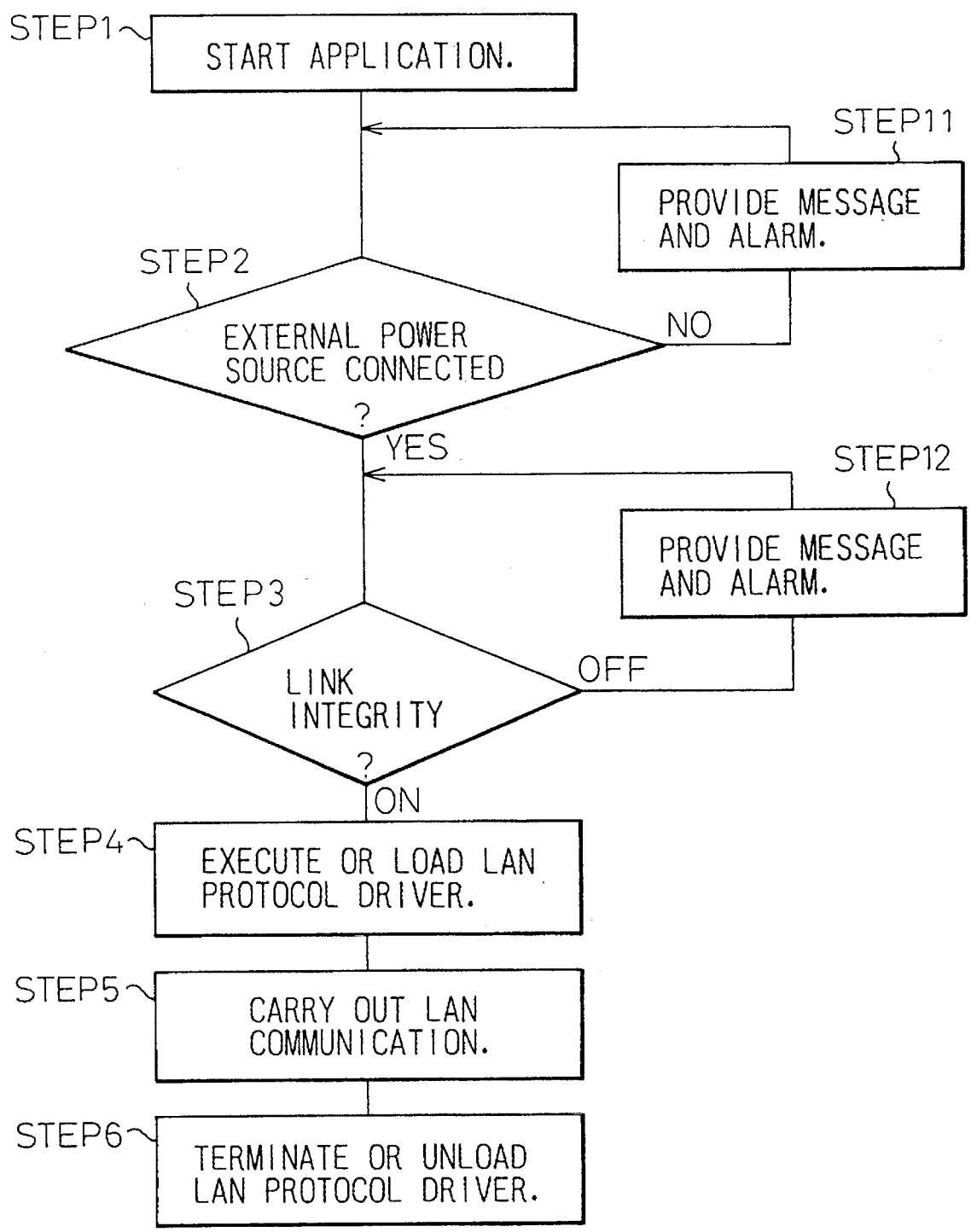
FIG. 8 is a flowchart showing steps of communication control according to the present invention.

FIG. 8 is a flowchart showing steps of controlling communications according to the embodiment of the present invention. In this flowchart, the portable terminal unit 13 of FIG. 6 downloads inventory management master data from the host apparatus 12.

In step 1, an operator controls the portable terminal unit 13 and starts a download application program stored in the memory of the terminal unit 13. Step 2 determines whether or not the terminal unit 13 is connected to the external power source 23. Namely, the CPU 25 reads the power source connection signal 29 in the state register 24. If the terminal unit 13 is connected to the external power source 23, step 3 is carried out.

If the terminal unit 13 is not connected to the external power source 23, step 11 is carried out. In the step 11, the CPU 25 displays a message of "CONNECT AC ADAPTOR" and produces an intermittent alarm sound to let the operator connect the terminal unit 13 to the external power source 23. The CPU 25 stops the message and alarm sound after the terminal unit 13 is connected to the external power source 23.

If the terminal unit 13 is connected to the external power source 23, the step 3 determines whether or not the terminal unit 13 is connected to the transmission line 15 of the LAN. Namely, the CPU 25 reads the link integrity signal 28 in the state register 24. If the terminal unit 13 is connected to the transmission line 15, step 4 is carried out.

If the terminal unit 13 is not connected to the transmission line 15, step 12 is carried out. In the step 12, the CPU 25 displays a message of "CONNECT TRANSMISSION LINE" and produces an intermittent alarm sound. When the terminal unit 13 is connected to the transmission line 15, the CPU 25 stops the message and alarm sound.

If the terminal unit 13 is connected to the transmission line 15 in the step 3, the step 4 determines that conditions for loading a LAN protocol driver have been met and loads the driver. The driver is usually divided into several parts.

In step 5, the terminal unit 13 starts to control the LAN protocol driver to communicate with the host apparatus 12. Firstly, the terminal unit 13 sends a connection request to the host apparatus 12. When receiving a connection permission from the host apparatus 12, the terminal unit 13 downloads the inventory management master data from an external storage device, such as a hard disk unit connected to the host apparatus 12.

After completing the download operation, step 6 unloads the LAN protocol driver and produces a continuous alarm sound to notify the operator of the completion of the download.

The flowchart of FIG. 8 carries out each of the steps of confirming the power source connection and the transmission line connection, once, before executing or loading the LAN protocol driver. They may be reconfirmed any time after the execution or loading of the LAN protocol driver, to quickly determine changes in the connection states of the transmission line and the external power source. In this embodiment, an operator starts the download application program. This program may be automatically started after confirming that the LAN transmission line and the external power source are connected.

As explained above, the present invention never uselessly executes the protocol driver if the terminal unit is not connected to both the LAN transmission line and the external power source, thereby improving the reliability of the LAN system.

The terminal unit according to the present invention may automatically start to communicate with the host apparatus once the terminal unit is connected to the LAN transmission line and/or to the external power source. This improves the operability of the terminal unit.

Namely, the decision unit of the terminal unit determines whether or not the terminal unit is connected to the transmission line and/or to the external power source and, according to the determination, the terminal unit controls the protocol driver with respect to the host apparatus. If the terminal unit is not connected to the LAN transmission line and/or to the external power source, the terminal unit does not control the protocol driver. The terminal unit never controls the protocol driver uselessly. The terminal unit may control the protocol driver only after detecting an acknowledge signal from the host apparatus. When the terminal unit is not connected to the transmission line or to the external power source, the terminal unit displays a message and an alarm to ask an operator to connect the terminal unit, respectively, to the transmission line or to the external power source.

I claim:

1. A terminal unit for connection to a network, for communicating with a host apparatus connected to the network, comprising:

decision means for determining whether or not the terminal unit is connected to a transmission line of the network and providing a connection signal Upon receiving an acknowledge signal from an apparatus connected to the transmission line; and communication control means for starting to communicate with the host apparatus in response to the connection signal only if the decision means determines that the terminal unit is connected to the transmission line.

2. The terminal unit according to claim 1, further comprising output means for providing an alarm if the decision means determines that the terminal unit is not connected to the transmission line.

3. The terminal unit according to claim 2, wherein the terminal unit is a portable terminal and is removably connectable to the transmission line.

4. The terminal unit according to claim 1, wherein the terminal unit is a portable terminal and is removably connectable to the transmission line.

5. The terminal unit according to claim 1, wherein the terminal unit is a portable terminal and is removably connectable to the transmission line.

6. A terminal unit for connection to a network and which receives power from an external power source, for communicating with a host apparatus connected to the network, comprising:

decision means for determining whether or not the terminal unit is connected to the external power source; and communication control means for starting to communicate with the host apparatus only if the decision means determines that the terminal unit is connected to the external power source.

7. The terminal unit according to claim 6, further comprising output means for providing an alarm if the decision means determines that the terminal unit is not connected to the external power source.

8. The terminal unit according to claim 7, wherein the terminal unit is a portable terminal unit which is removably connectable to the transmission line and has an internal power source.

9. The terminal unit according to claim 6, wherein the decision means is a power source controller which detects and controls power from the external power source.

10. The terminal unit according to claim 9, wherein the terminal unit is a portable terminal unit which is removably connectable to the transmission line and has an internal power source.

11. The terminal unit according to claim 6, wherein the terminal unit is a portable terminal unit which is removably connectable to the transmission line and has an internal power source.

12. A portable terminal unit removably connectable to a network, for communicating with a host apparatus connected to the network, comprising:

a communication interface for detecting a link connection signal, thereby to confirm that the terminal unit is connected to a transmission line of the network, and for controlling communications with the host apparatus;

a power source control for determining whether or not the terminal unit is connected to an external power source before communicating with the host apparatus;

a connection state storage unit for storing the states of a transmission line connection signal from the communication interface and of a power source connection signal from the power source controller; and a communication controller for confirming connection states to the transmission line and external power source according to the data in the storage unit and, in accordance with the connection states, instructing the communication interface to control a protocol driver to communicate with the host apparatus.

13. A method of controlling a portable terminal unit that is removably connectable to a transmission line of a network and which communicates with a host apparatus connected to the network, comprising the steps of:

determining whether or not the terminal unit is connected to the transmission line of the network and providing a connection signal upon receiving an acknowledge signal from an apparatus connected to the transmission line;

providing an alarm signal to ask an operator to connect the terminal unit to the transmission line if it is determined that the terminal unit is not connected to the transmission line; and communication control means for activating a protocol driver to communicate with the host apparatus, in response to the connection signal only if it is determined that the terminal unit is connected to the transmission line.

14. The method according to claim 13, wherein the alarm signal is a message displayed on a display panel of the portable terminal unit.

15. The method according to claim 13, wherein the alarm signal is an intermittent alarm sound produced by the portable terminal unit.

16. The method according to claim 13, wherein the alarm signal turns on an alarm lamp arranged on the portable terminal unit.

17. A method of controlling a portable terminal unit that is removably connectable to a transmission line of a network and which communicates with a host apparatus connected to the network, comprising the steps of:

determining whether or not the terminal unit is connected to an external power source;

providing an alarm signal to ask an operator to connect the terminal unit to the external power source if it is determined that the terminal unit is not connected to the external power source;

determining, if it is determined that the terminal unit is connected to the external power source, whether or not the terminal unit is connected to the transmission line in accordance with a link connection signal provided through the transmission line;

providing an alarm signal to urge the operator to connect the terminal unit to the transmission line if it is determined that the terminal unit is not connected to the transmission line; and activating a protocol driver to communicate with the host apparatus if it is determined that the terminal unit is connected to the transmission line.

18. The method according to claim 17, wherein the alarm signal is a message displayed on a display panel of the portable terminal unit.

19. The method according to claim 17, wherein the alarm signal is an intermittent alarm sound produced by the portable terminal unit.

20. The method according to claim 17, wherein the alarm signal turns on an alarm lamp arranged on the portable terminal unit.

* * * * *

UNITED STATES PATENT AND TRADEMARK OFFICE
CERTIFICATE OF CORRECTION

PATENT NO. : 5,610,593
DATED : Mar. 11, 1997
INVENTOR(S) : SETO

It is certified that error appears in the above-indentified patent and that said Letters Patent is hereby corrected as shown below:

Col. 3, line 16, after "driven by" insert --a--;
line 35, change "we" to --are--.

Col. 4, line 17, change "port 11" to --port $11_{n+1}$--;
line 31, delete "been"; and change "part" to --port--;
line 34, change "ALAN" to --A LAN--;
line 43, change "ALAN" to --A LAN--.

Col. 5, line 28, after "signal." start a new paragraph with "In response".

Signed and Sealed this

Eighth Day of July, 1997

Attest:

BRUCE LEHMAN

*Attesting Officer*  *Commissioner of Patents and Trademarks*